United States Patent
Heo et al.

(10) Patent No.: US 8,862,375 B2
(45) Date of Patent: Oct. 14, 2014

(54) SYSTEM AND METHOD FOR CALCULATING DISTANCE TO EMPTY OF GREEN VEHICLE

(71) Applicants: Hyundai Motor Company, Seoul (KR); Kia Motors Corporation, Seoul (KR)

(72) Inventors: Sang Jin Heo, Gyeonggi-do (KR); Eui Sun Hong, Chungcheongnam-do (KR); Young Chan Byun, Hwaseong (KR); Seon Young Park, Gyeonggi-do (KR); Byung Soon Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/715,936

(22) Filed: Dec. 14, 2012

(65) Prior Publication Data

US 2014/0095060 A1    Apr. 3, 2014

(30) Foreign Application Priority Data

Sep. 28, 2012    (KR) .................. 10-2012-0108488

(51) Int. Cl.
G06F 19/00 (2011.01)
H02J 7/00 (2006.01)
G01R 31/36 (2006.01)
B60L 11/18 (2006.01)

(52) U.S. Cl.
CPC ................... *B60L 11/1861* (2013.01)
USPC .............. 701/123; 320/132; 702/63

(58) Field of Classification Search
USPC ................. 701/123; 702/63; 320/132
See application file for complete search history.

(56) References Cited

U.S. PATENT DOCUMENTS

| | | | |
|---|---|---|---|
| 6,618,681 B2* | 9/2003 | Hoenig et al. | 702/63 |
| 7,521,935 B2* | 4/2009 | Uchida | 324/426 |
| 7,800,344 B2* | 9/2010 | Simopoulos et al. | 320/132 |
| 8,306,681 B2* | 11/2012 | Soma | 701/22 |
| 2007/0018608 A1* | 1/2007 | Okumura | 320/104 |
| 2011/0153141 A1* | 6/2011 | Beechie et al. | 701/29 |

FOREIGN PATENT DOCUMENTS

| | | |
|---|---|---|
| JP | 2002-051470 A | 2/2002 |
| JP | 2008-220080 A | 9/2008 |
| KR | 10-2005-0017478 | 2/2005 |
| KR | 10-2005-0053412 | 6/2005 |
| KR | 10-2006-0116724 | 11/2006 |
| KR | 10-2011-0040220 A | 4/2011 |
| KR | 10-2011-0081604 A | 7/2011 |

* cited by examiner

*Primary Examiner* — Thomas G Black
*Assistant Examiner* — Tyler Paige
(74) *Attorney, Agent, or Firm* — Edwards Wildman Palmer LLP; Peter F. Corless (57) ABSTRACT

Disclosed is a system and method for computing distance to empty (DTE) based on available energy computed using a battery SOC vs open circuit voltage (OCV) table, battery temperature vs energy efficiency, an energy efficiency vs energy table, etc., to enable a more accurate calculation of the DTE in consideration of the temperature of the battery, which is one of disturbance elements.

11 Claims, 8 Drawing Sheets

PRIOR ART

SYSTEM AND METHOD FOR CALCULATING DISTANCE TO EMPTY OF GREEN VEHICLE

CROSS-REFERENCE TO RELATED APPLICATION

This application claims under 35 U.S.C. §119(a) the benefit of Korean Patent Application No. 10-2012-0108488 filed Sep. 28, 2012, the entire contents of which are incorporated herein by reference.

BACKGROUND (a) Technical Field

The present invention relates to a system and method for calculating distance to empty (DTE) of a green vehicle. More particularly, the present invention relates to a system and method for calculating a DTE of a green vehicle, which can compute available energy of a battery and more accurately compute DTE using the computed available energy.

(b) Background Art

Green vehicles are considered as any green vehicle which does not discharge exhaust gas. These types of vehicles include a pure electric vehicle driven using power of an electric motor, a hybrid vehicle driving using combined power from a motor and an engine, a fuel cell vehicle driven via power from an electric motor operated by electricity generated within a fuel cell, or any other vehicle that has substantially lower emissions that a conventional internal combustion vehicle.

A high-voltage battery as an electric power source for driving a motor, a converter, etc., are often mounted in such a green vehicle. The current status of the battery should be maintained at a satisfactory level by monitoring the voltage, current, temperature, etc. of the battery and estimating a temperature of the battery and a degree of degradation of the battery including a state of charge (SOC) [%] of the battery. Therefore, a battery management system (BMS), e.g., a kind of controller, is mounted in the green vehicle, to generally manage various states of the battery, preventing reduction in lifespan of the battery due to the degradation of durability of the battery, estimating the SOC of the battery, and the like.

As such, it is very important to detect the SOC of the battery in the green vehicle using the high-voltage battery. Particularly, it is required to develop a technique for informing a driver of distance to empty (DTE) through the medium of a cluster by detecting the SOC of the battery, etc., while driving.

Generally, in gasoline and diesel vehicles, a system and method is applied in which a current DTE is predicted in such a manner that measures the amount of fuel in a fuel tank using a sensor, etc. and multiplies accumulated fuel efficiency by the amount of remaining fuel. However, in green vehicles, the current DTE is predicted by measuring the amount of discharge current used per unit of time (e.g., a second or minute) in a battery and accordingly estimates a current SOC of the battery.

Figure 1:
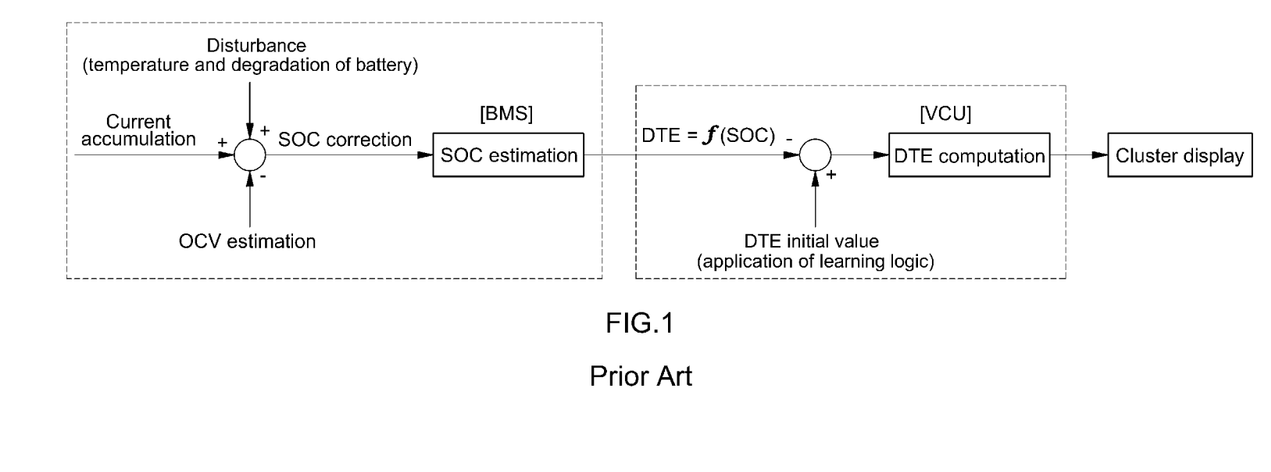
FIGS. 1 and 2 are respectively a control diagram and a flowchart illustrating a conventional method for driving to empty (DTE) computation of a green vehicle.
Figure 2:
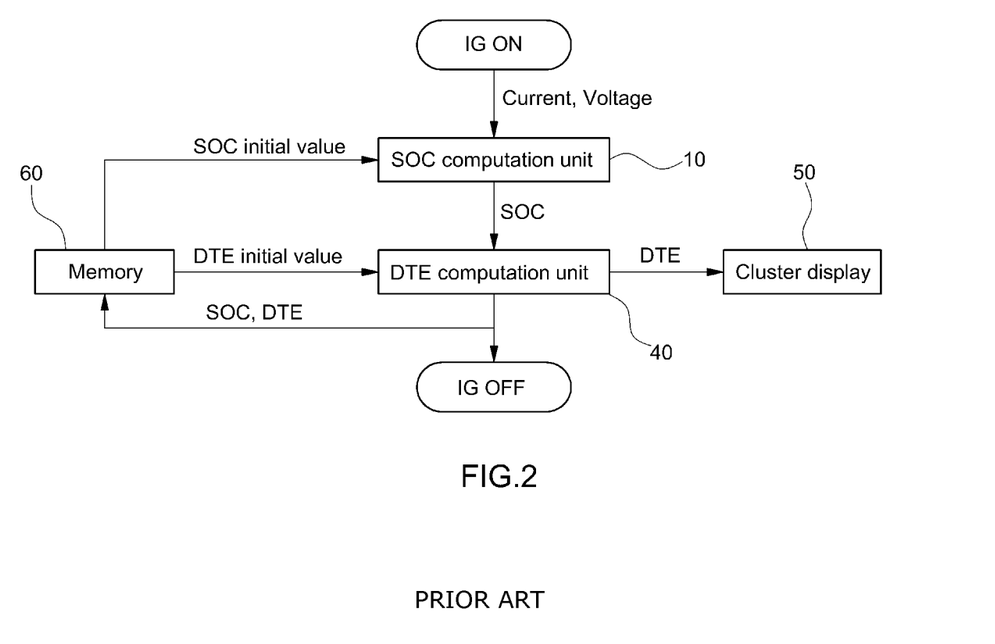

Hereinafter, a conventional method for DTE computation of a green vehicle will be described with reference FIGS. 1 and 2. First, a current SOC of a battery is estimated by an SOC computation unit 10 within a controller.

Estimating the current SOC of the battery is performed by measuring the amount of discharging current used per unit of time in the battery and accumulating the measured amounts and then correcting the SOC by adding/subtracting data on disturbance elements (e.g., temperature and degradation of the battery) data and an open circuit voltage (OCV) for voltage compensation of the battery to/from current accumulated data.

Next, a current DTE is computed based on an SOC estimated in a DTE computation unit 40. In this case, the estimated SOC and the computed DTE are stored in a memory 60. Thus, the current DTE is finally computed in such a manner that adds/subtracts an initial value of DTE according to a learning logic to/from the DTE computed based on the estimated SOC. Then, the finally computed current DTE is displayed in a cluster display 50 so that a driver can identify the current DTE.

When a driver starts the vehicle in an indoor parking state and drives the vehicle outdoors or parks the vehicle outdoors, external temperature is lowered. However, as the temperature of the battery among disturbance elements is not considered in the computation of the DTE, the temperature of the battery is also lowered. Therefore, the DTE is not accurately computed but computed rather excessively (i.e., high). Further, the DTE is rapidly reduced in a low SOC of the battery during long-distance driving.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a system and method for distance to empty (DTE) computation of a green vehicle, which does not employ a conventional system and method for computing DTE based on the state of charge (SOC) of a battery but rather employs a method for computing DTE based on available energy computed using a battery SOC vs open circuit voltage (OCV) table, battery temperature vs energy efficiency, an energy efficiency vs energy table, etc., to enable a more accurate calculation of the DTE in consideration of the temperature of the battery, which is one of a plurality of disturbance elements effecting the efficiency of a battery.

In one aspect, the present invention provides a method for DTE computation of a green vehicle, the method including: computing, by a controller, a current available energy of a battery, based on energy efficiency ($\eta$) of the battery, available energy when the state of charge (SOC) is 100% ($E_{@SOC=100\%}$) extracted from an energy efficiency vs energy table, and information on real-time SOC (%); computing, by the controller, DTE based on the computed available energy; and displaying, on the display, the computed DTE in a cluster.

In an exemplary embodiment, the energy efficiency ($\eta$) may be computed by estimating, by the controller, an SOC in a load state in which the battery is discharged; extracting, by the controller, an open circuit voltage and a current corresponding to the current SOC estimated from a battery SOC vs open circuit voltage (OCV) table; and computing, by the controller, an energy efficiency of the battery by substituting the extracted open circuit voltage and the current in:

$$\text{Energy efficiency }(\eta) = \left(1 - \frac{\int |i \cdot (v_t - v_e)| dt}{\int |i \cdot v_i| dt + \int |i \cdot v_e| dt}\right) \cdot 100.$$

In another exemplary embodiment, when estimating the SOC, the estimated current SOC may be stored in an SOC memory of the controller so as to be used in the computation of the available energy.

In still another exemplary embodiment, the energy efficiency ($\eta$) may be computed by measuring a temperature of a battery in a non-load state in which the battery is discharged; and extracting energy efficiency corresponding to the measured temperature of the battery by substituting the measured temperature of the battery in a battery temperature vs energy efficiency table.

In yet another exemplary embodiment, the available energy may be computed by substituting, by the controller, the energy efficiency of the battery in the energy efficiency vs energy table, thereby extracting the available energy when the state of charge (SOC) is 100% ($E_{@SOC=100\%}$); and the energy efficiency ($\eta$) of the battery, the available energy when the state of charge (SOC) is 100% ($E_{@SOC=100\%}$), extracted from the SOC memory, and the information on real-time SOC (%) in:

$$\text{Energy efficiency }(\eta) = \left(1 - \frac{\int |i \cdot (v_t - v_e)| dt}{\int |i \cdot v_i| dt + \int |i \cdot v_e| dt}\right) \cdot 100.$$

In still yet another exemplary embodiment, the DTE may be computed by a multiplication of battery-electric efficiency (km/kwh) and available energy.

Other aspects and exemplary embodiments of the invention are discussed infra.

As described above, the present invention employs a method for computing available energy supplied from the battery using the battery SOC vs OCV table, the battery temperature vs energy efficiency, the energy efficiency vs energy table, etc., and computing DTE based on the available energy, so that the DTE can be more accurately computed and displayed even during the winter, etc., in consideration of the temperature of the battery, which is one of a plurality of disturbance elements that effects a battery's efficiency.

Thus, it is possible to solve a problem in that DTE is not accurately computed since the DTE is computed based on only the battery SOC without considering the temperature of the battery among the disturbance elements. Particularly, as the temperature of the battery is changed due to a difference in temperature between interior and exterior of a vehicle during winter.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present invention employs a system and method for computing distance to empty (DTE) based on available energy of a battery to enable a more accurate computation of the DTE in consideration of a temperature of the battery, which is one of disturbance elements affecting the efficiency of a battery.

First, for better understanding of the present invention, available energy of a battery will be described.

Figure 5:
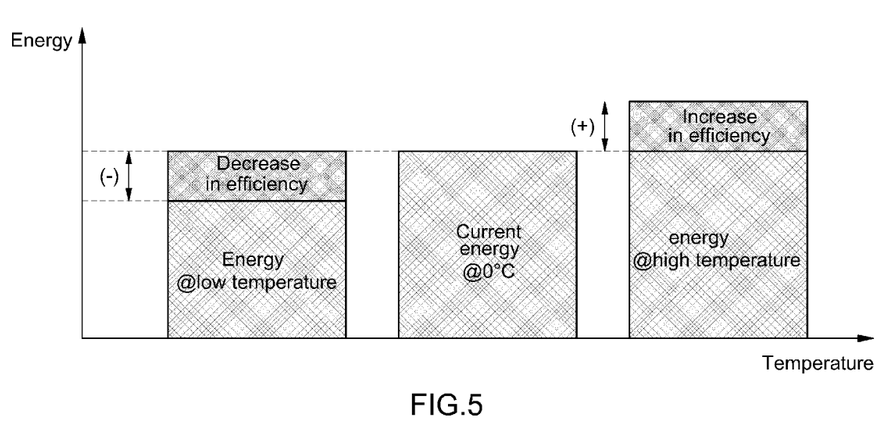
FIGS. 5 and 6 are graphs illustrating the definition and computing process of available energy used when the DTE of the green vehicle is computed according to the exemplary embodiment of the present invention.

The available energy is expressed as a function using temperature, degradation, state of charge (SOC), etc. of the battery as variable factors. As shown in FIG. 5, it can be seen that the available energy supplied from the battery is changed depending on the temperature of the battery. It can also be seen that the energy efficiency of the battery increases as the temperature of the battery rises, and thus the available energy increases. In this case, the energy efficiency is expressed as shown in the following Equation 1.

$$\therefore \text{Energy efficiency } (\eta) = \left(1 - \frac{\int |i \cdot (v_t - v_e)| dt}{\int |i \cdot v_t| dt + \int |i \cdot v_e| dt}\right) \cdot 100 \qquad \text{Equation 1}$$

In the above Equation 1, i denotes current, $V_t$ denotes a terminal voltage of the battery, $V_e$ denotes an open circuit voltage of the battery, $\int |i \cdot v_t| dt$ and $\int |i \cdot v_e| dt$ denote charging and discharging energy (hereinafter, referred to as charging/discharging energy), and $\int |i \cdot (v_t - v_e)| dt$ denotes heat loss energy generated when the battery is charged and discharged.

Hereinafter, a series of processes of computing available energy based on the energy efficiency of the battery and then computing DTE in load and non-load states of the battery will be sequentially described with reference to FIGS. 3 to 8.

Load State of Battery

Figure 3:
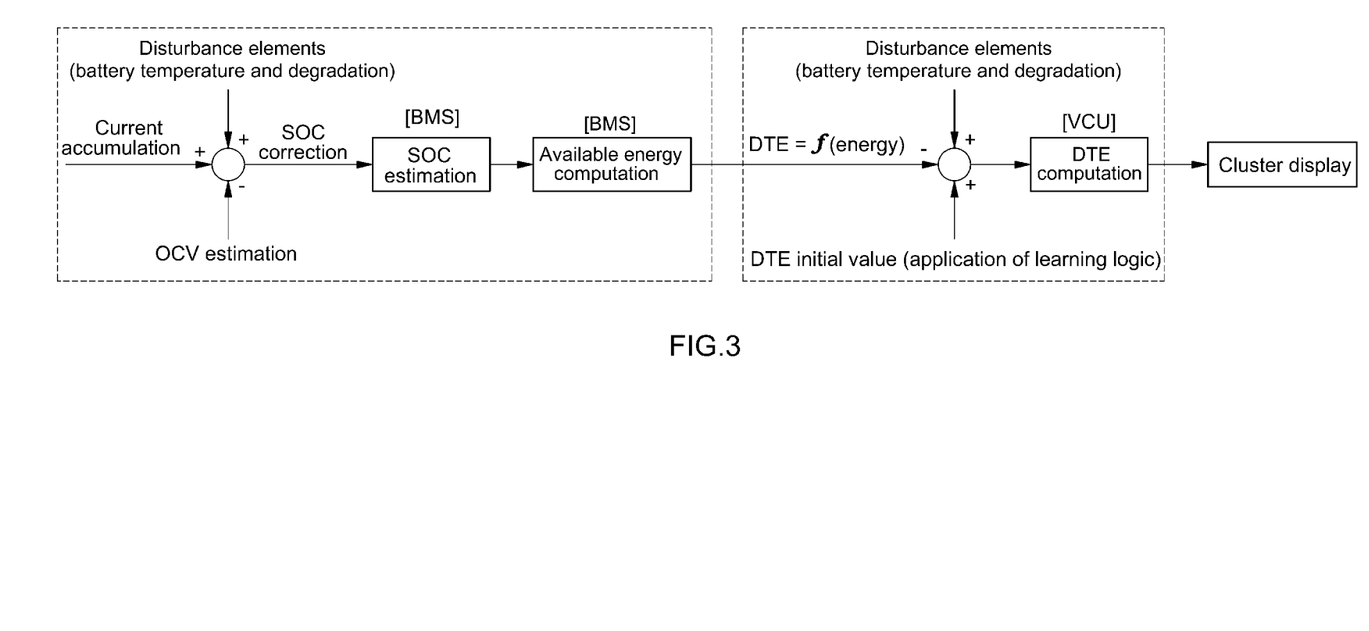
FIGS. 3 and 4 are respectively a control diagram and a flowchart illustrating a method for driving to DTE computation of a green vehicle according to an exemplary embodiment of the present invention.
Figure 4:
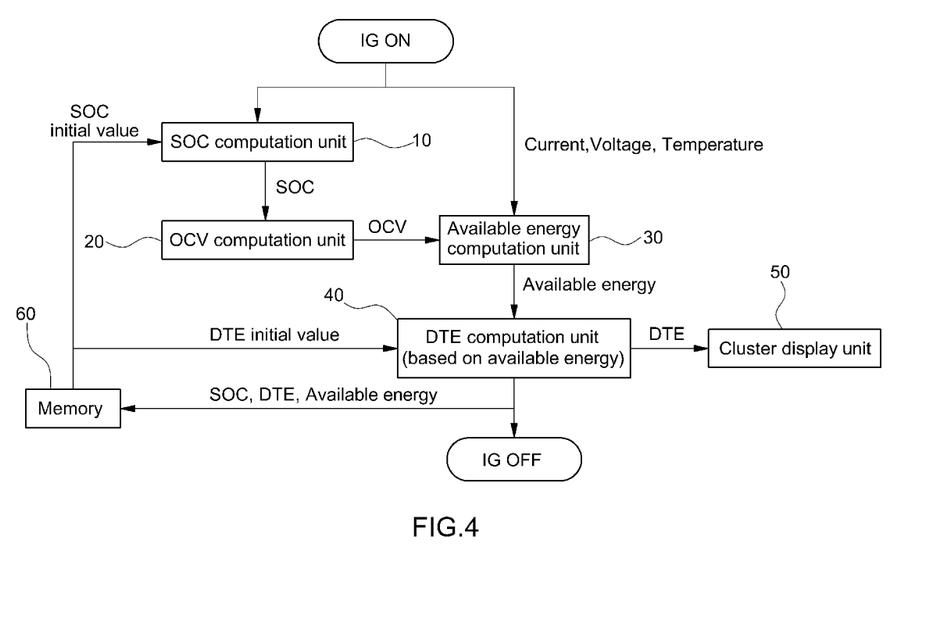

When the battery is in a load state in which the battery is discharged after the ignition of the vehicle is on, a current SOC of the battery is estimated by an SOC computation unit 10 executed by a processor in a controller. Estimating the current SOC is performed by measuring, by the controller, amounts of discharging current used per unit of time (e.g., seconds, minutes, hours, etc.) in the battery and accumulating the measured amounts and correcting the SOC by adding/subtracting an open circuit voltage (OCV) for voltage compensation of the battery.

Next, the estimated current SOC is substituted in a map table of an OCV computation unit 20, i.e., a battery SOC vs OCV table data-mapped through tests, thereby obtaining an OCV corresponding to the estimated current SOC from the battery SOC vs OCV table. In this case, the estimated current SOC is an SOC memory unit 60 so as to be obtained when available energy is computed.

Next, the available energy of the battery is computed in an available energy computation unit 30 via, e.g., a processor in the controller. Therefore, computing energy efficiency of the battery is performed as a preceding step. That is, once an open circuit voltage and current corresponding to the current SOC is obtained from the battery SOC vs OCV table and then input to the available energy computation unit 30, the energy efficiency of the battery is computed by Equation 1.

Subsequently, energy of the battery when the SOC is 100% ($E_{@SOC=100\%}$) is determined by substituting the energy efficiency of the battery, computed as described above, in an energy efficiency vs energy table data-mapped through tests, and the available energy is then computed.

Figure 6:
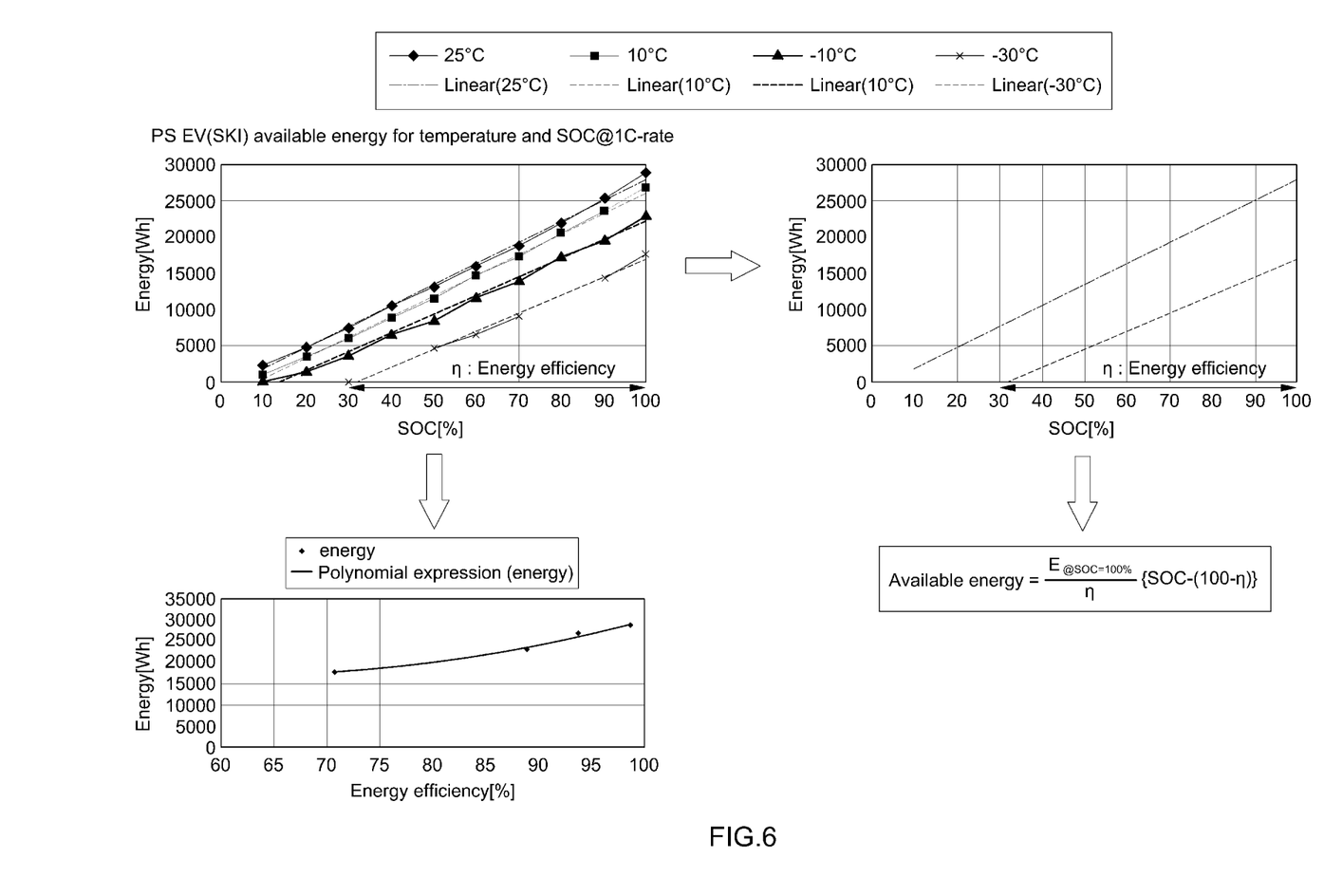

FIG. 6 illustrates available energy for each temperature and SOC of the battery at 1C-rate (capacity of the battery, which can be used for 1 hour). As can be seen in FIG. 6, the energy efficiency and available energy are changed depending on the temperature of the battery. For example, as can be seen in (b) of FIG. 6, available energy as compared with energy efficiency when the temperature of the battery is 25° C. is different from that when the temperature of the battery is −30° C. As can be seen in (a) of FIG. 6, energy efficiency and available energy when the SOC is 100% corresponding to the energy efficiency can be obtained for each temperature (25° C., 10° C., −10° C. and −30° C.), and thus the energy efficiency vs energy table can be data-mapped in the same manner as the graph shown in (c) of FIG. 6. Thus, when the energy efficiency of the battery, computed by Equation 1, is substituted in the energy efficiency vs energy table, the available energy when the SOC is 100% ($E_{@SOC=100\%}$) can be obtained.

Subsequently, the current available energy of the battery can be computed using the following Equation 2, based on the energy efficiency ($\eta$) computed by Equation 1, the available energy when the SOC is 100% ($E_{@SOC=100\%}$) extracted from the energy efficiency vs energy table, and information on real-time SOC (%) extracted from the SOC memory unit.

$$\text{Available energy} = \frac{E_{@SOC=100\%}}{\eta}\{SOC - (100 - \eta)\} \qquad \text{Equation 2}$$

Next, DTE is computed based on the available energy of the battery, computed as described above, by a DTE computation unit 40. The DTE is obtained by a multiplication of battery-electric efficiency (km/kwh) and available energy, and the battery-electric efficiency is computed by the following Equation 3.

Battery-electric efficiency(km/kwh)=battery-electric efficiency(past)*A+battery-electric efficiency (present)*B+partial electric efficiency(present)*C  Equation 3

In Equation 3, A, B and C denote adjustable weights (coefficients).

Finally, DTE obtained by the multiplication of battery-electric efficiency (km/kwh) and available energy is displayed in a cluster display 50 so that a driver can identify the DTE. Meanwhile, the factors used in the computation, i.e., the real-time SOC, the available energy, etc., including the DTE computed as described above, are stored in a memory or other storage device and then used as initial values in a non-load state after the ignition of the vehicle is on (IG ON).

Non-Load State of Battery

When the battery is in a non-load state in which the battery is not discharged after the ignition of the vehicle is on, the SOC estimated in the load state and then stored in the SOC memory or other storage device is used as an SOC initial value. Next, energy efficiency of the battery is computed by the controller according to the temperature of the battery.

Figure 7:
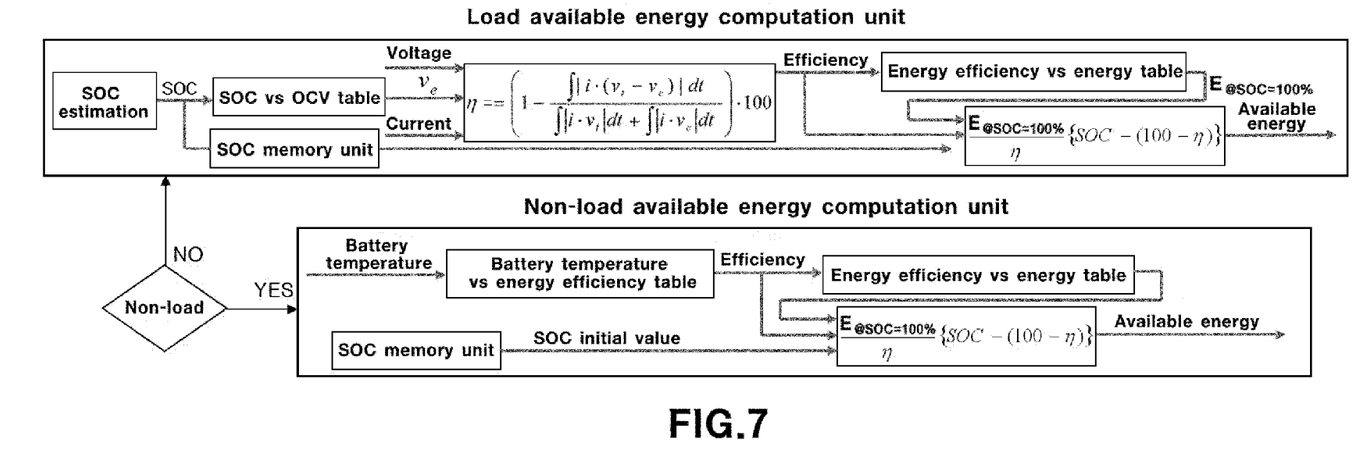
FIG. 7 is a detailed control diagram illustrating in detail the method for the DTE computation of the green vehicle according to an exemplary embodiment of the present invention.
Figure 8:
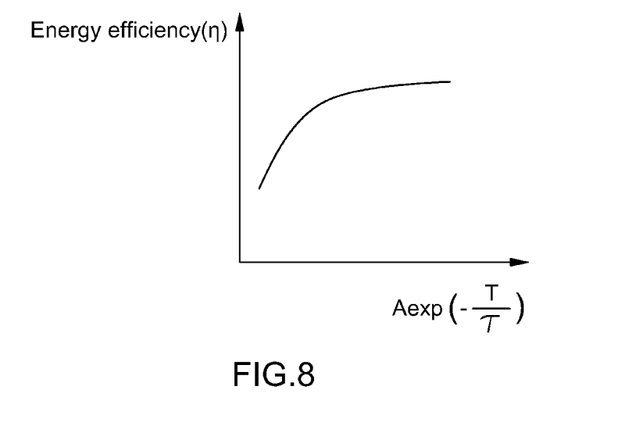
FIG. 8 is a diagram illustrating an energy efficiency vs temperature table used when the DTE of the green vehicle is computed according to the exemplary embodiment of the present invention.

As shown in FIG. 7, data in a map table for battery temperature vs energy efficiency can be obtained through tests, when considering that the energy efficiency exponentially decreases as the temperature of the battery decreases, and the energy efficiency exponentially increases as the temperature of the battery increases. Accordingly, when the temperature of the battery, measured using a temperature sensor, etc., is substituted in a battery temperature vs energy efficiency table, the energy efficiency corresponding to the measured temperature of the battery is extracted.

Next, like the load state of the battery, the available energy when the SOC is 100% ($E_{@SOC=100\%}$) is extracted by substituting the extracted energy efficiency of the battery in the energy efficiency vs energy table data-mapped through tests in the available energy computation unit 30, and the available energy is then computed. Subsequently, the current available energy of the battery can be computed using the Equation 2, based on the energy efficiency (η) extracted from the battery temperature vs energy efficiency table, the available energy when the SOC is 100% ($E_{@SOC=100\%}$) extracted from the energy efficiency vs energy table, and information on real-time SOC (%) extracted from the SOC memory or other storage device in the load state.

Next, DTE is computed based on the available energy of the battery, computed in the DTE computation unit 40 as described above in the same manner as the load state of the battery, and therefore, its detailed description will be omitted. Finally, DTE obtained by the multiplication of battery-electric efficiency (km/kwh) and available energy is displayed in a cluster display 50 so that a driver can identify the DTE.

As described above, the present invention employs a system and method of computing available energy supplied from the battery and computing DTE based on the available energy, so that the DTE can be more accurately computed and displayed even in winter season, etc., in consideration of the temperature of the battery, which is one of disturbance elements affecting battery efficiency.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for distance to empty (DTE) computation of a green vehicle, the method comprising:
computing, by a controller, a current available energy of a battery, based on energy efficiency (η) of the battery, available energy when the state of charge (SOC) is 100% ($E_{@SOC=100\%}$) extracted from an energy efficiency vs energy table, and information on real-time SOC (%);
computing, by the controller, DTE based on the computed available energy; and
displaying, on a display, the computed DTE in a cluster,
wherein the energy efficiency is computed by:
estimating an SOC in a load state in which the battery is discharged;
extracting open circuit voltage and current corresponding to the current SOC estimated form a battery SOC versus open circuit voltage (OCV) table; and
computing energy efficiency of the battery by substituting the extracted open circuit voltage and current in:

$$\text{Energy efficiency } (\eta) = \left(1 - \frac{\int |i \cdot (v_t - v_e)| dt}{\int |i \cdot v_i| dt + \int |i \cdot v_e| dt}\right) \cdot 100.$$

wherein i denotes current, $V_t$ denotes a terminal voltage of the battery, $V_e$ denotes an open circuit voltage of the battery, $\int |i \cdot v_t| dt$ and $\int |i \cdot v_e| dt$ denote charging and discharging energy, and $\int |i \cdot (v_t - v_e)| dt$ denotes heat loss energy generated when the battery is charged and discharged.

2. The method of claim 1, wherein, in the estimating of the SOC, the estimated current SOC is stored in an SOC memory so as to be used in the computation of the available energy.

3. The method of claim 1, wherein the energy efficiency (η) is computed by measuring a temperature of a battery in a non-load state in which the battery is discharged; and extracting energy efficiency corresponding to the measured temperature of the battery by substituting the measured temperature of the battery in a battery temperature vs energy efficiency table.

4. The method of claim 1, wherein the available energy is computed by substituting the energy efficiency of the battery in the energy efficiency vs energy table, thereby extracting the available energy when the state of charge (SOC) is 100% ($E_{@SOC=100\%}$); and the energy efficiency (η) of the battery, the available energy when the state of charge (SOC) is 100% ($E_{@SOC=100\%}$), extracted from the SOC memory, and the information on real-time SOC (%) in:

$$\text{Available energy } = \frac{E_{@SOC=100\%}}{\eta} \{SOC - (100 - \eta)\}.$$

5. The method of claim 1, wherein the DTE is computed by a multiplication of battery-electric efficiency (km/kwh) and available energy.

6. A non-transitory computer readable medium containing program instructions executed by a processor or controller, the computer readable medium comprising:
program instructions that compute a current available energy of a battery, based on energy efficiency (η) of the battery, available energy when the state of charge (SOC) is 100% ($E_{@SOC=100\%}$) extracted from an energy efficiency vs energy table, and information on real-time SOC (%);
program instructions that compute DTE based on the computed available energy; and
program instructions that display the computed DTE in a cluster,
wherein the energy efficiency (η) is computed by estimating an SOC in a load state in which the battery is discharged; extracting open circuit voltage and current corresponding to the current SOC estimated from a battery SOC vs open circuit voltage (OCV) table; and computing energy efficiency of the battery by substituting the extracted open circuit voltage and current in:

$$\text{Energy efficiency } (\eta) = \left(1 - \frac{\int |i \cdot (v_t - v_e)| dt}{\int |i \cdot v_i| dt + \int |i \cdot v_e| dt}\right) \cdot 100.$$

wherein i denotes current, $V_t$ denotes a terminal voltage of the battery, $V_e$ denotes an open circuit voltage of the battery, $\int |i \cdot v_t| dt$ and $\int |i \cdot v_e| dt$ denote charging and discharging energy, and $\int |i \cdot (v_t - v_e)| dt$ denotes heat loss energy generated when the battery is charged and discharged.

7. The non-transitory computer readable medium of claim 6, wherein, in the estimating of the SOC, the estimated current SOC is stored in an SOC memory so as to be used in the computation of the available energy.

8. The non-transitory computer readable medium of claim 6, wherein the energy efficiency (η) is computed by measuring a temperature of a battery in a non-load state in which the battery is discharged; and extracting energy efficiency corresponding to the measured temperature of the battery by substituting the measured temperature of the battery in a battery temperature vs energy efficiency table.

9. The non-transitory computer readable medium of claim 6, wherein the available energy is computed by substituting the energy efficiency of the battery in the energy efficiency vs energy table, thereby extracting the available energy when the state of charge (SOC) is 100% ($E_{@SOC=100\%}$); and the energy efficiency ($\eta$) of the battery, the available energy when the state of charge (SOC) is 100% ($E_{@SOC=100\%}$), extracted from the SOC memory, and the information on real-time SOC (%) in:

$$\text{Available energy} = \frac{E_{@SOC=100\%}}{\eta}\{SOC-(100-\eta)\}.$$

10. The non-transitory computer readable medium of claim 6, wherein the DTE is computed by a multiplication of battery-electric efficiency (km/kwh) and available energy.

11. The method for distance to empty (DTE) computation of a green vehicle, wherein the available energy is expressed as a function using temperature, degradation, state of charge (SOC) of the battery as variable factors.

* * * * *